(12) United States Patent
Poindexter, Jr.

(10) Patent No.: US 9,527,452 B2
(45) Date of Patent: Dec. 27, 2016

(54) DUAL ACCESS ENCLOSURE

(71) Applicant: NYX, Inc., Livonia, MI (US)

(72) Inventor: Reginald Edward Poindexter, Jr., Warren, MI (US)

(73) Assignee: NYX, INC., Livonia, MI (US)

( * ) Notice: Subject to any disclaimer, the term of this patent is extended or adjusted under 35 U.S.C. 154(b) by 12 days.

(21) Appl. No.: 14/650,894

(22) PCT Filed: Dec. 10, 2013

(86) PCT No.: PCT/US2013/074074
§ 371 (c)(1),
(2) Date: Jun. 10, 2015

(87) PCT Pub. No.: WO2014/093315
PCT Pub. Date: Jun. 19, 2014

(65) Prior Publication Data
US 2015/0321615 A1    Nov. 12, 2015

Related U.S. Application Data

(60) Provisional application No. 61/735,334, filed on Dec. 10, 2012.

(51) Int. Cl.
*B60R 7/00* (2006.01)
*B60R 7/04* (2006.01)
*B60J 5/00* (2006.01)
*E05B 61/00* (2006.01)
*E05B 65/06* (2006.01)
(Continued)

(52) U.S. Cl.
CPC .. *B60R 7/04* (2013.01); *B60J 5/00* (2013.01); *E05B 61/00* (2013.01); *E05B 65/06* (2013.01); *E05D 7/00* (2013.01); *E05D 15/502* (2013.01); *E05Y 2900/538* (2013.01); *E05Y 2900/602* (2013.01)

(58) Field of Classification Search
CPC ............... B60R 7/04; B60J 5/00; E05B 61/00; E05B 65/06; E05D 7/00; E05D 15/502; E05Y 2900/538; E05Y 2900/602
See application file for complete search history.

(56) References Cited

U.S. PATENT DOCUMENTS 847,145 A    3/1907 Abzug
5,195,272 A    3/1993 Yamada
(Continued)

OTHER PUBLICATIONS

International Search Report for PCT Application No. PCT/US2013/074074 completed Mar. 31, 2014.

*Primary Examiner* — Lori L Lyjak
(74) *Attorney, Agent, or Firm* — Carlson, Gaskey & Olds, P.C.

(57) ABSTRACT

A dual access enclosure includes a base that has a compartment therein and a lid that at least partially encloses the compartment. The lid includes first and second latch mechanisms that are configured to selectively allow the lid to be pivotably opened from two opposed sides. The first and second latch mechanisms are moveable over respective strokes between opened and closed positions, and ends of the strokes of the first and second latch mechanisms coincide such that one of the first or second latch mechanisms in its opened position blocks the other of the first or second latch mechanisms from moving from its closed position to its opened position.

20 Claims, 6 Drawing Sheets

(51) Int. Cl.
    *E05D 7/00*           (2006.01)
    *E05D 15/50*         (2006.01)

(56) References Cited

U.S. PATENT DOCUMENTS

2003/0209956 A1    11/2003   Bae
2008/0197648 A1*   8/2008    Smith ..................... B60R 7/04
                                                        296/24.34

* cited by examiner

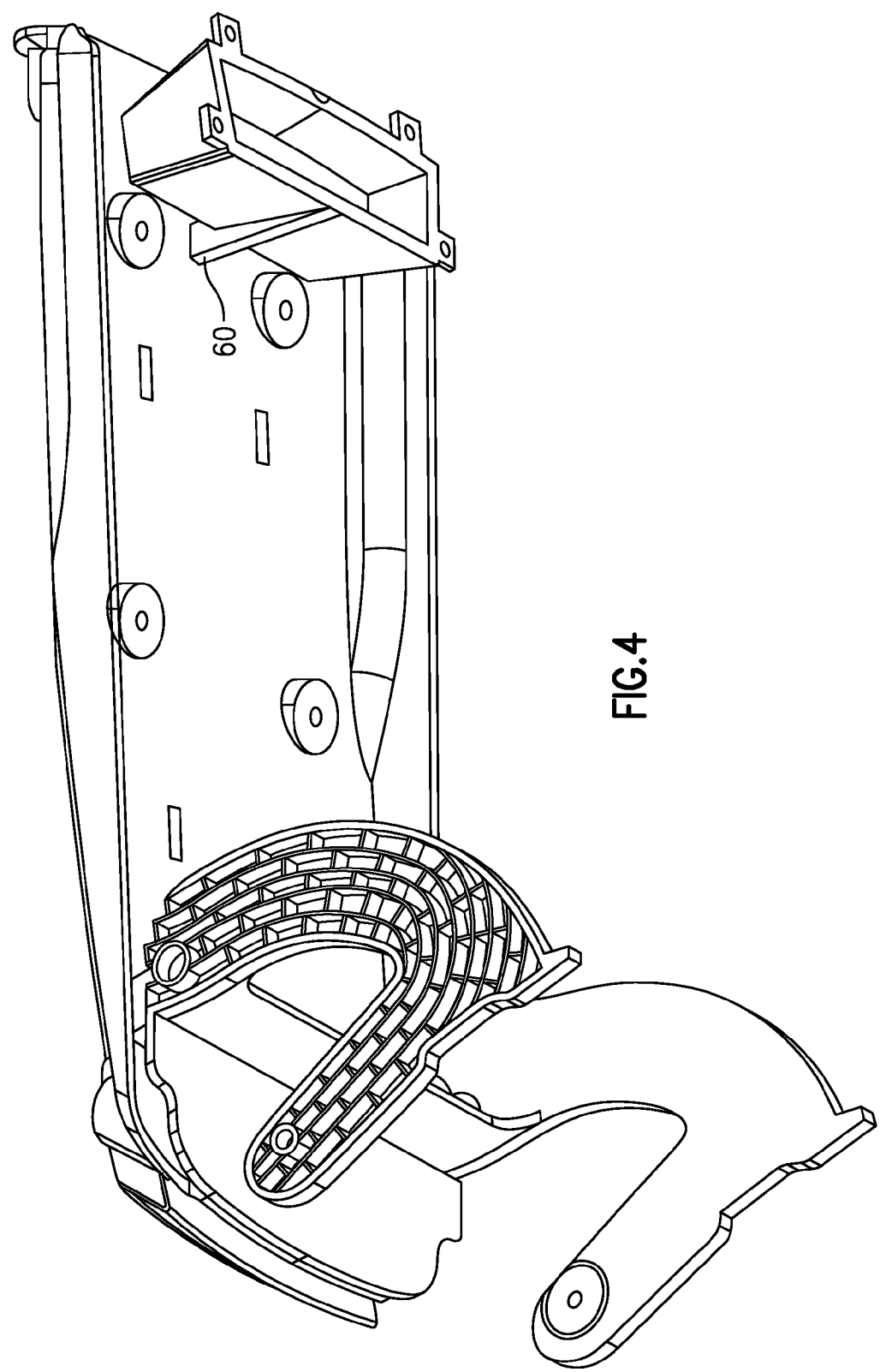

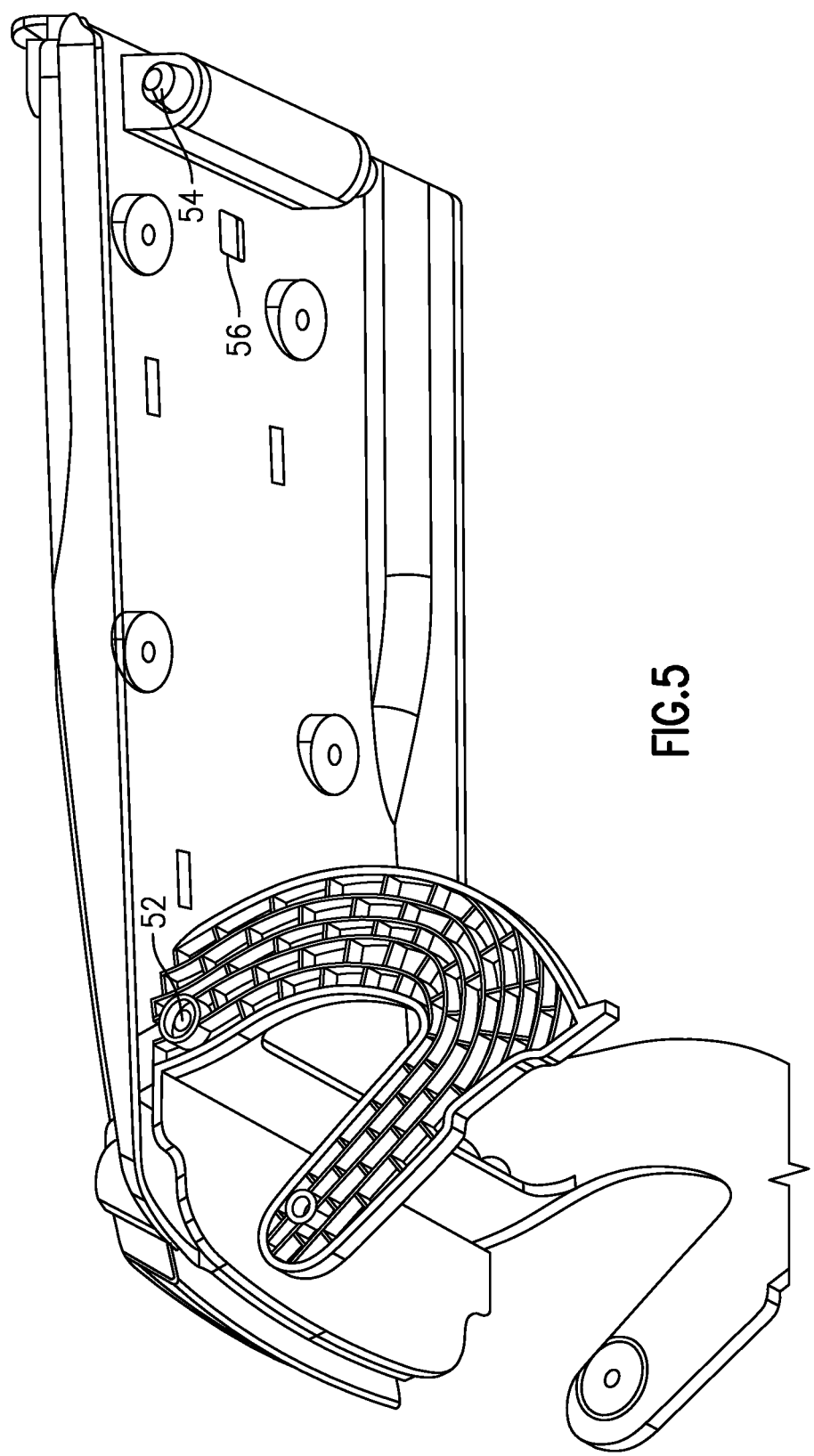

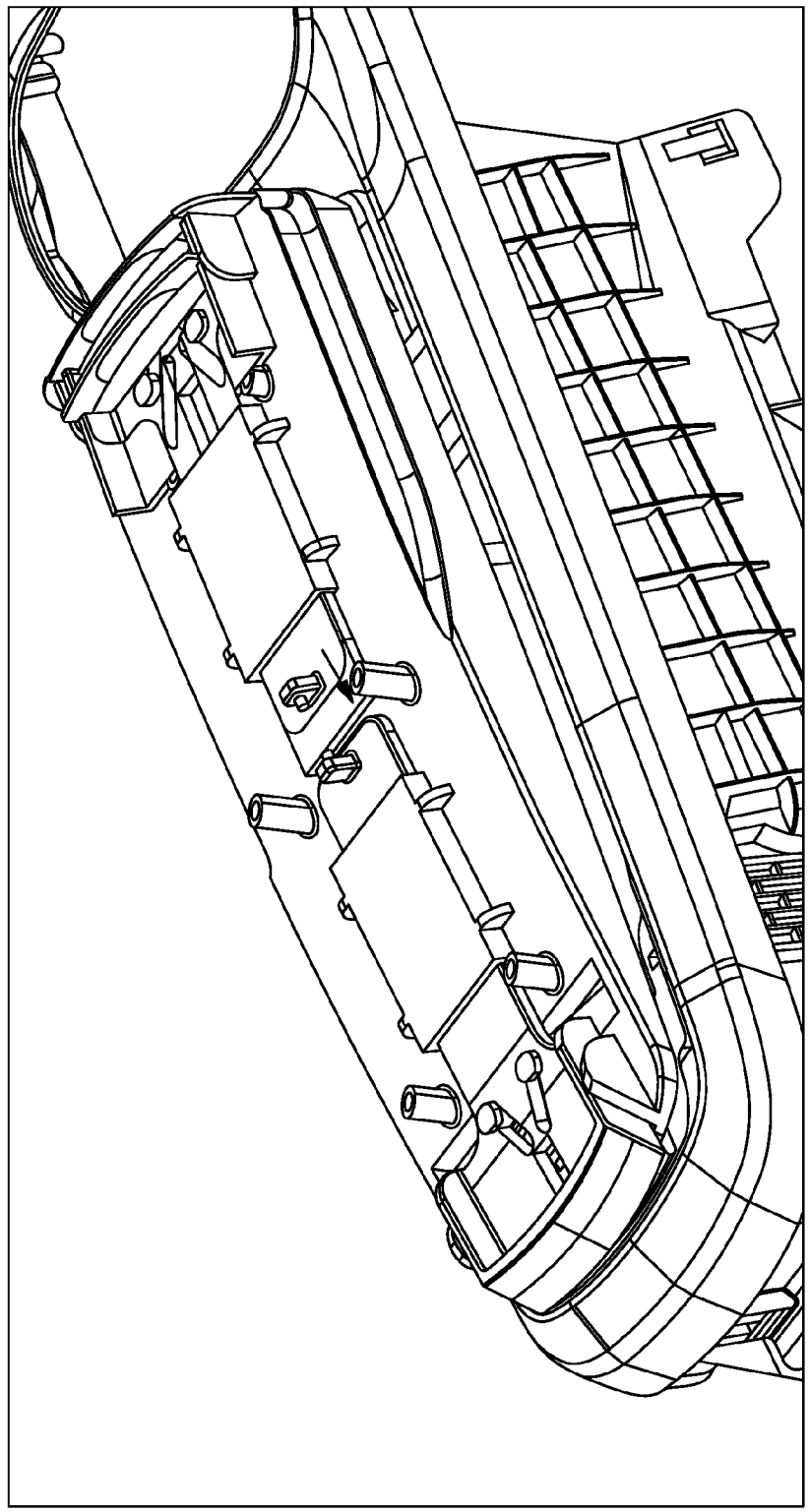

DUAL ACCESS ENCLOSURE

CROSS-REFERENCE TO RELATED APPLICATION

This application claims priority to U.S. Provisional Patent Application No. 61/735,334, filed Dec. 10, 2012.

BACKGROUND

This disclosure relates to multi-access enclosures. Vehicle consoles, storage compartments, portable and non-portable containers, and other covered-access enclosures typically have a lid that permits access to an interior area. The lid can be attached at a hinge to allow pivoting between opened and closed positions.

SUMMARY

A dual access enclosure according to an example of the present disclosure includes a base that has a compartment therein and a lid that at least partially encloses the compartment. The lid includes first and second latch mechanisms that are configured to selectively allow the lid to be pivotably opened from two opposed sides. The first and second latch mechanisms are moveable over respective strokes between opened and closed positions, and ends of the strokes of the first and second latch mechanisms coincide such that one of the first or second latch mechanisms in its opened position blocks the other of the first or second latch mechanisms from moving from its closed position to its opened position. In a further example, the dual access enclosure can be an vehicle console.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4 illustrates an underside of the lid of FIG. 3.

FIG. 5 illustrates another view of the underside of the lid 26 of FIG. 3.

FIG. 6 illustrates the lid of FIG. 1 with the latch mechanism 30 moved from its closed position (FIG. 1) to an opened position.

DETAILED DESCRIPTION

Figure 1:
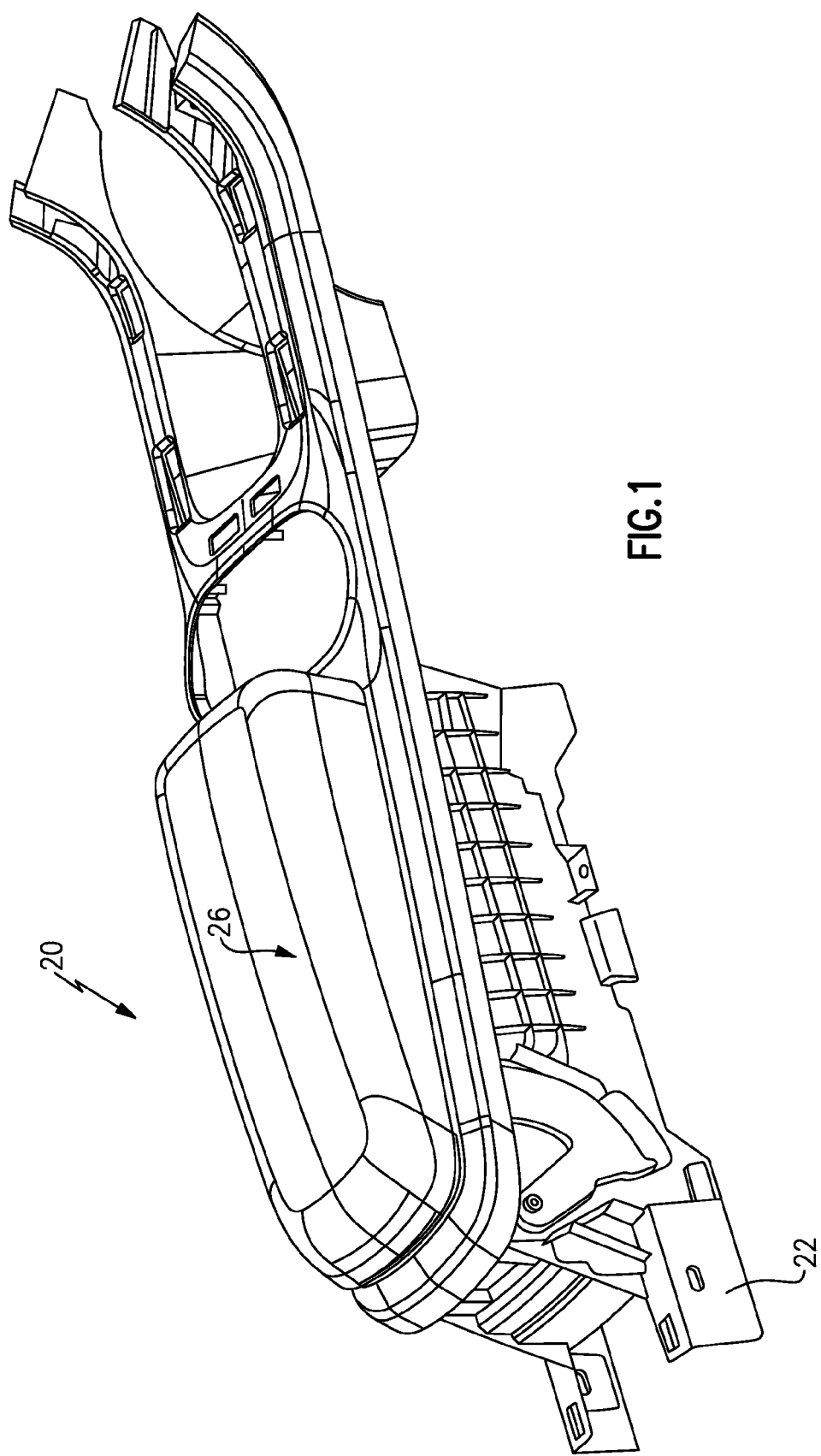
FIG. 1 illustrates an example dual axis enclosure.

FIG. 1 illustrates an example dual access enclosure 20 (hereafter "enclosure 20"). In the illustrated example, the enclosure 20 is a vehicle console. However, the examples herein are not limited to vehicle consoles and other types of enclosures, including non-vehicle enclosures, will also benefit from the examples herein.

The enclosure 20 includes a base 22 that defines a compartment 24 therein. A lid 26 at least partially encloses the compartment 24. In this example, the lid 26 is a top-mounted lid, but in other applications the lid 26 could be side- or bottom-mounted. As shown in FIG. 1, the lid 26 includes a trim piece, which is removed in FIG. 2 to reveal first and second latch mechanisms 28 and 30 of the lid 26. FIG. 3 also shows an isolated view of the lid 26, separate from the base 22. The latch mechanisms 28/30 are configured to selectively allow the lid 26 to be pivotably opened from two opposed sides. In the illustrated example, the lid 26 can thus be opened from the front, generally represented at F in FIG. 2, or from the rear, generally represented at R in FIG. 2.

The latch mechanisms 28 and 30 each include respective handle portions 32 and 34, at least portions of which are exposed for actuation by a user. The latch mechanisms 28/30 further include respective elongated tongues 36 and 38 that extend from the respective handle portions 32/34. The elongated tongues 36/38 extend through respective guide members 40 and 42. The guide members 40/42 limit lateral movement of the tongues 36/38 such that each of the tongues 36/38 and handles 32/34 are permitted to move primarily along an axial direction, represented at A in FIG. 2.

The latch mechanisms 28/30 further include respective pairs of cam slots 44 and 46 and corresponding pairs of cam followers 48 and 50 that are operably connected with a corresponding pairs of retractable hinge pins 52 and 54 (FIG. 5). In this example, the cam slots 44/46 are each arranged in a V-formation such that actuation from a closed position to an opened position causes the cam followers 48 or 50 to move toward the narrow end of the V-formation and retract the corresponding hinge pins 52 or 54. In one example, the retractable hinge pins 52/54 can be spring-actuated such that they are biased toward an extended or locked position in which they engage and lock with the base 22. The spring-actuation can also serve to urge the latch mechanisms 28/30 toward the closed position when in an opened position.

FIGS. 4 and 5 show an opposed side of the lid 26. The lid 26 includes an opening 57 that extends there through and exposes the latch mechanism 30. A similar opening can be provided adjacent the other latch mechanism 28.

Figure 2:
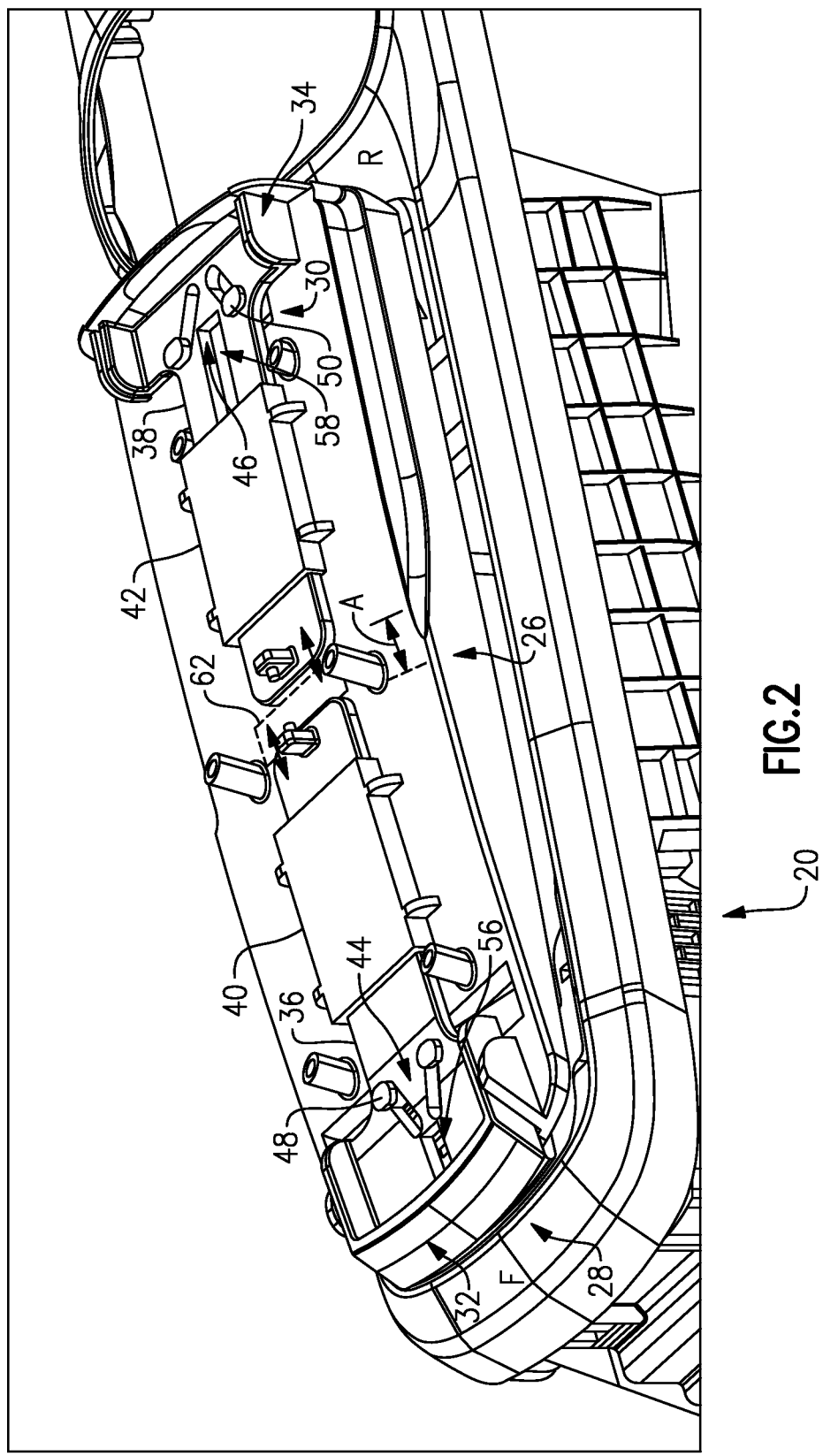
FIG. 2 illustrates the enclosure of FIG. 1, including first and second latch mechanisms.
Figure 3:
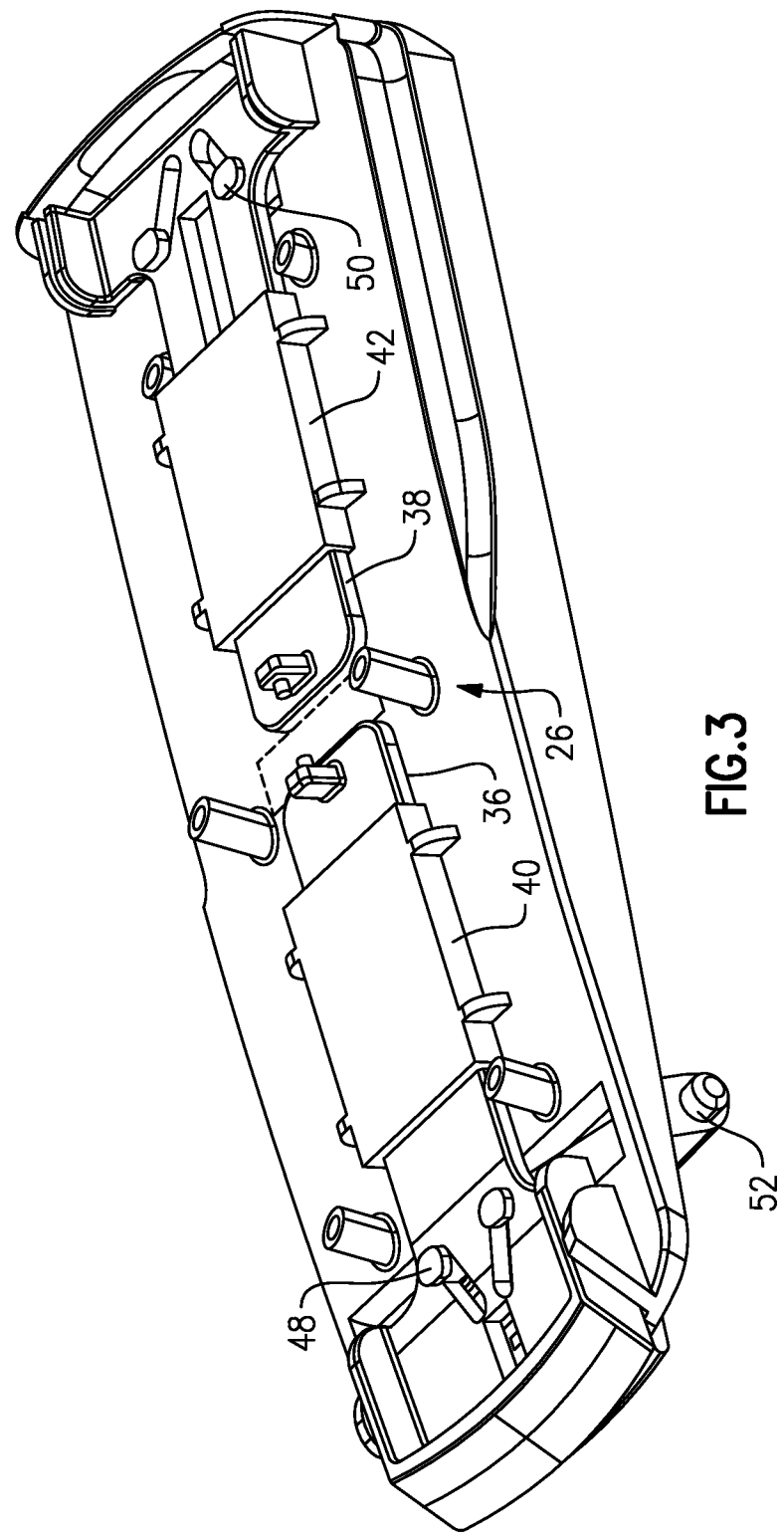
FIG. 3 illustrates an isolated view of the lid and latch mechanisms of FIG. 2.

As shown in FIG. 2, each of the latch mechanisms 28/30 is in a closed, or non-actuated, position in which the retractable hinge pins 52/54 are locked with the base 22. Upon actuation of either of the latch mechanisms 28 or 30, the actuated one of the latch mechanisms 28 or 30 moves along direction A to an actuated, opened position (FIG. 6). In this regard, the latch mechanisms 28/30 include respective locking mechanisms 56 and 58, such as locking tabs, that are configured to engage and lock the respective latch mechanisms 28/30 in the actuated, opened position. Upon closure of the lid 26 an unlocking mechanism, such as finger 60, extends through the corresponding opening 57 to disengage and release the respective latch mechanism 28 and 30 to return it to its closed position locked to the base 22.

The latch mechanisms 28/30 are each movable over a stroke, which encompasses the range of movement between the fully opened and fully closed positions. The tongues 36/38 are co-linear and the ends of the strokes of the latch mechanisms 28/30 thus coincide at region 62 (FIG. 2) such that one of the latch mechanisms 28/30 in its opened position blocks the other of the latch mechanisms 28/30 from moving from its closed position to its opened position. That is, only one of the tongues 38/36 can occupy the region 62 at any one time. Once the tongue 36 or 38 is actuated to the opened position to occupy region 62, the other tongue 36 or 38 cannot be actuated into the region 62. In this regard, only one of the latch mechanisms 28/30 can be opened at a time such that when the lid 26 is opened from one side, the other side cannot be opened and is in its closed position locked to the base 22 to act as a pivot. Closure of the lid 26 then causes the disengagement mechanism 60 to release the latch mechanism 28 or 30 such that it can return to its closed position, at which time either one of the latch mechanisms 28 or 30 can then be moved to its respective opened position.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A dual access enclosure comprising:
a base including a compartment therein; and
a lid at least partially enclosing the compartment, the lid including first and second latch mechanisms configured to selectively allow the lid to be pivotably opened from two opposed sides, the first and second latch mechanisms being moveable over respective strokes between opened and closed positions, and ends of the strokes of the first and second latch mechanisms coincide such that one of the first or second latch mechanisms in its opened position blocks the other of the first or second latch mechanisms from moving from its closed position to its opened position.

2. The enclosure as recited in claim 1, wherein the first and second latch mechanisms each include a pair of cam slots and a corresponding pair of cam followers operably connected with a corresponding pair of retractable hinge pins.

3. The enclosure as recited in claim 2, wherein the pair of cam slots are oriented in a V-formation.

4. The enclosure as recited in claim 2, wherein each of the cam slots is linear.

5. The enclosure as recited in claim 1, wherein the first and second latch mechanisms include respective locking mechanisms configured to engage and lock the respective first and second latch mechanisms in the opened position.

6. The enclosure as recited in claim 5, wherein the first and second latch mechanisms include respective unlocking mechanisms configured to disengage and release the respective first and second latch mechanisms from the opened position in response to closing of the lid.

7. The enclosure as recited in claim 6, wherein the respective unlocking mechanisms include a finger that extends through an opening in the lid upon closing of the lid to disengage and release the respective first and second latch mechanisms.

8. The enclosure as recited in claim 1, wherein each of the first and second latch mechanisms includes an exposed handle portion and an elongated tongue extending from the exposed handle portion through a guide member, the guide member limiting lateral movement.

9. The enclosure as recited in claim 8, wherein the elongated tongue of the first latch mechanism and the elongated tongue of the second latch mechanism are co-linear.

10. A lid for a dual access enclosure, comprising:
a lid including first and second latch mechanisms configured to selectively allow the lid to be pivotably opened from two opposed sides, the first and second latch mechanisms being moveable over respective strokes between opened and closed positions, and ends of the strokes of the first and second latch mechanisms coincide such that one of the first or second latch mechanisms in its opened position blocks the other of the first or second latch mechanisms from moving from its closed position to its opened position.

11. The lid as recited in claim 10, wherein the first and second latch mechanisms each include a pair of cam slots and a corresponding pair of cam followers operably connected with a corresponding pair of retractable hinge pins.

12. The lid as recited in claim 11, wherein the pair of cam slots is oriented in a V-formation.

13. The lid as recited in claim 11, wherein each of the cam slots is linear.

14. The lid as recited in claim 10, wherein the first and second latch mechanisms include respective locking mechanisms configured to engage and lock the respective first and second latch mechanisms in the opened position.

15. The lid as recited in claim 14, wherein the lid includes openings there through, the openings being adjacent the first and second latch mechanisms such that portions of the first and second latch mechanisms are exposed through the lid.

16. The lid as recited in claim 10, wherein each of the first and second latch mechanisms includes an exposed handle portion and an elongated tongue extending from the exposed handle portion through a guide member, the guide member limiting lateral movement.

17. The lid as recited in claim 16, wherein the elongated tongue of the first latch mechanism and the elongated tongue of the second latch mechanism are co-linear.

18. A dual access enclosure comprising
a vehicle console including a base having a compartment therein and a lid at least partially enclosing the compartment, the lid including first and second latch mechanisms configured to selectively allow the lid to be pivotably opened from two opposed sides, the first and second latch mechanisms being moveable over respective strokes between opened and closed positions, and ends of the strokes of the first and second latch mechanisms coincide such that one of the first or second latch mechanisms in its open position blocks the other of the first or second latch mechanisms from moving from its closed position to its opened position.

19. The enclosure as recited in claim 18, wherein the first and second latch mechanisms include respective locking mechanisms configured to engage and lock the respective first and second latch mechanisms in the opened position, and the first and second latch mechanisms include respective unlocking mechanisms configured to disengage and release the respective first and second latch mechanisms from the opened position in response to closing of the lid.

20. The enclosure as recited in claim 19, wherein the respective unlocking mechanisms include a finger that extends through an opening in the lid upon closing of the lid to disengage and release the respective first and second latch mechanisms.

* * * * *